UNITED STATES PATENT OFFICE.

ROBERT R. HILL, OF VERONA, NEW JERSEY.

SPARK-PLUG.

1,360,294. Specification of Letters Patent. Patented Nov. 30, 1920.

Application filed March 21, 1919. Serial No. 284,002.

*To all whom it may concern:*

Be it known that I, ROBERT R. HILL, a citizen of the United States, and a resident of Verona, county of Essex, and State of New Jersey, have invented certain new and useful Improvements in Spark-Plugs, of which the following is a specification.

My invention relates to electric spark plugs for use in combustion engines, especially those of the type used on motors for automobiles and other land or marine vehicles. The object of my invention is to prevent the fouling of the electrodes by carbon accretions which are apt to occur by reason of direct contact with the hydro-carbon fuel, the imperfect combustion of the latter, and for other reasons well known in the art.

The invention consists essentially in making one of the electrodes in the form of a baffle or shield for the protection of the other electrode from direct impingement of the charges of hydro-carbon, at the same time creating an incipient ignition chamber between the two electrodes, the charge-firing explosion in which tends to blow off and keep clean the opposed surfaces of both electrodes,—at the same time subjecting the protecting or cap-electrode temporarily to a degree of heat high enough to produce incandescence for a period sufficient to insure the burning and reduction of any carbon residue resulting from imperfect combustion, all as hereinafter more fully set forth.

In the accompanying drawings,

Figure 1, is an elevation of a spark plug provided with one form of my cap electrode;

Fig. 2, is an inner end elevation thereof;

Fig. 3, is a section of the inner end of the spark plug upon an enlarged scale for clearness of illustration, and taken upon plane of line 3—3, Fig. 2;

Fig. 4, is a transverse section taken upon plane of line 4—4, Fig. 3;

Fig. 5, is an elevation of the cap electrode shown in the preceding figures; and Fig. 6, is a view like unto Fig. 3, showing a modification of the cap electrode.

It is well known in the art that the main difficulty with electric spark plugs is the fouling of the terminals or electrodes by deposits of carbon derived from the hydrocarbon fuel used in combustion engines, rendering their cleaning or replacement imperative after comparatively short periods of use. In other words, the life and utility of a spark plug used to effect the explosion of hydrocarbon in a combustion motor is limited by such accretions of carbon on and between the sparking poles.

I obviate this difficulty by making one of the electrodes, preferably the ground or negative electrode $n$, in the form of a cap adapted to fit over, inclose, and shield the other, or central positive or high tension electrode $p$, substantially as shown in the drawings,—said cap-electrode $n$, being formed with openings $n'$, of an aggregate area adapted to admit sufficient hydrocarbon vapor into the inclosed space $s$, to provide for an incipient explosion therein when the spark passes between the electrodes $p$, $n$, while at the same time the main surface of said cap-electrode $n$, is sufficient in extent to shield the central positive electrode $p$, from the direct impact of the hydrocarbon charge.

The cap electrode $n$, is made of relatively thin nickle alloy or equivalent metallic substance that will not fuse or burn even when incandescent, as when rendered temporarily so by the heat generated both by the incipient or charge-firing ignition within the electrode chamber $s$, and by the combustion of the main charge of hydrocarbon in the power cylinder of the motor.

It is obvious that the openings $n'$, in the cap-electrode $n$, may be of various forms without departing from the spirit of my invention, and with like results, so that I do not limit myself in this respect. Thus, in the first four figures of the accompanying drawings I show the openings $n'$, as made in the form of radiant slots, while in Fig. 6, round or oblong openings are adapted to perform a like function in providing for restricted communication with the incipient ignition chamber or space $s$.

Also, it is obvious that the cap-electrode $n$, being preferably made in the form of an attachment, may be affixed to the spark plug in contactual and electrical engagement with the ground, or shell $g$, in various ways with like result. Thus, in Fig. 3, the inturned edges of the cap-electrode $n$, are shown as pressed into a groove formed between the shell $g$, and the insulating sleeve $i$, in which case one of the slots $n'$, may be extended to

UNITED STATES PATENT OFFICE.

HARRY R. HIRST, OF TRENTON, NEW JERSEY, ASSIGNOR OF ONE-HALF TO FREDERICK S. DEARDEN, OF TRENTON, NEW JERSEY.

CHALK-HANGER.

1,360,295.  Specification of Letters Patent.  Patented Nov. 30, 1920.

Application filed May 28, 1919. Serial No. 300,313.

*To all whom it may concern:*

Be it known that I, HARRY R. HIRST, a citizen of the United States, residing at Trenton, in the county of Mercer and State of New Jersey, have invented certain new and useful Improvements in Chalk-Hangers, of which the following is a specification.

My invention relates to improvements in a chalk hanger for pool and billiard tables. The object of invention is to provide a chalk hanger which will carry a block of chalk on a flexible extension cord, in an elevated position and which will allow the cord to be extended and the chalk conveniently used for chalking a cue; a further object of my invention is to arrange the weight, provided for returning the chalk to its normal position, so that it will slide upon the cord and thus return slowly to the normal position without making any jar or sound and without causing the chalk to fly back and strike the ceiling or the walls of the room; heretofore freely acting springs and weights have been used to pull the chalk back to its original position after the user lets go of it and the chalk would fly back with a crash against the ceiling, causing the plaster to fall upon the tables and also break the piece of chalk; a still further object of my invention is to provide a properly balanced weight which will tend to straighten the cord should it become twisted; a still further object of my invention is to provide a suitable chalk clamp for attaching the block of chalk to the cord and for holding the chalk so that it can not be removed from the clamp without breaking it into pieces; and a still further object of my invention is to provide a suitable pulley for holding the cord to the ceiling and permit the cord to be inclined at any angle and also keep the cord from becoming entangled.

Referring to the accompanying drawing; Figure 1, is a side elevation of my improved chalk hanger; Fig. 2 is an edge view of the pulley shown in Fig. 1; Fig. 3, is a plan view of the weight; Fig. 4, is a vertical section of the clamp shown in Fig. 1; and Fig. 5, is a horizontal section on line 5—5 Fig. 4.

In the drawings in which like reference characters refer to like parts, 1 represents a pulley having a swiveled plate 2, loosely pivoted in the side members 3. Said plate 2 is provided with an aperture through which a screw 5, or other suitable fastening device, may pass to secure the pulley to the ceiling of a room. A cord 6 passes over the wheel 4 of the pulley and through holes formed in the guide plate 7, provided to insure the cord running freely over the pulley.

Attached to one end of the cord 6 is a weight 10, which is oval shape in plan view, as shown in Fig. 3. The weight is provided with an aperture 12, extending through the heavier portion of the weight, to receive the end of the cord 6. The cord has an enlarged end 9 thereon, which fits into a countersunk recess formed in the weight, and supports the latter.

The weight 10 is provided at its smaller end with an aperture 14, forming a free passageway through the weight for the portion 8 of the cord to pass. A knot 15, located in the cord below the weight limits the downward movement of the weight.

The center of gravity of the weight is adjacent to the end 9 of the cord, so that when the weight is resting upon the knot 15 it will be slightly tilted, as shown in full lines in Fig. 1, this reduces the tendency of the weight to spin and causes it to come to rest when the upper portions of the cord are not twisted around each other. When the weight 10 is raised by pulling down on the free end of the cord the weight will hang level, as shown in dotted lines Fig. 1, and the portion 8 of the cord will run freely through the passageway 14 formed in the weight.

The chalk clamp 18 consists of a rectangular metal shell, open at the bottom for the insertion of a block of chalk 19. The side walls 20 of the clamp are provided with inwardly bent tongues 21, formed from the metal shell by cutting through the wall 20, on three sides of the tongue. The resilient nature of the metal of the tongues causes them to act as springs and impinge against the block of chalk when the latter is pressed into the shell. The sharp edges 22 of the tongues 21 prevent the block of chalk from being pulled out of the clamp without breaking the chalk, and thus prevents the chalk from being stolen.

The dome shaped top 24 of the clamp provides room for the knot 25 formed on the cord after it has been passed through the aperture 26 formed in the dome of the clamp. The clamp as thus constructed per-